No. 858,478. PATENTED JULY 2, 1907.
F. L. SESSIONS.
CONTROLLER FOR STORAGE BATTERIES AND SIMILAR PURPOSES.
APPLICATION FILED OCT. 29, 1903. RENEWED NOV. 9, 1906.
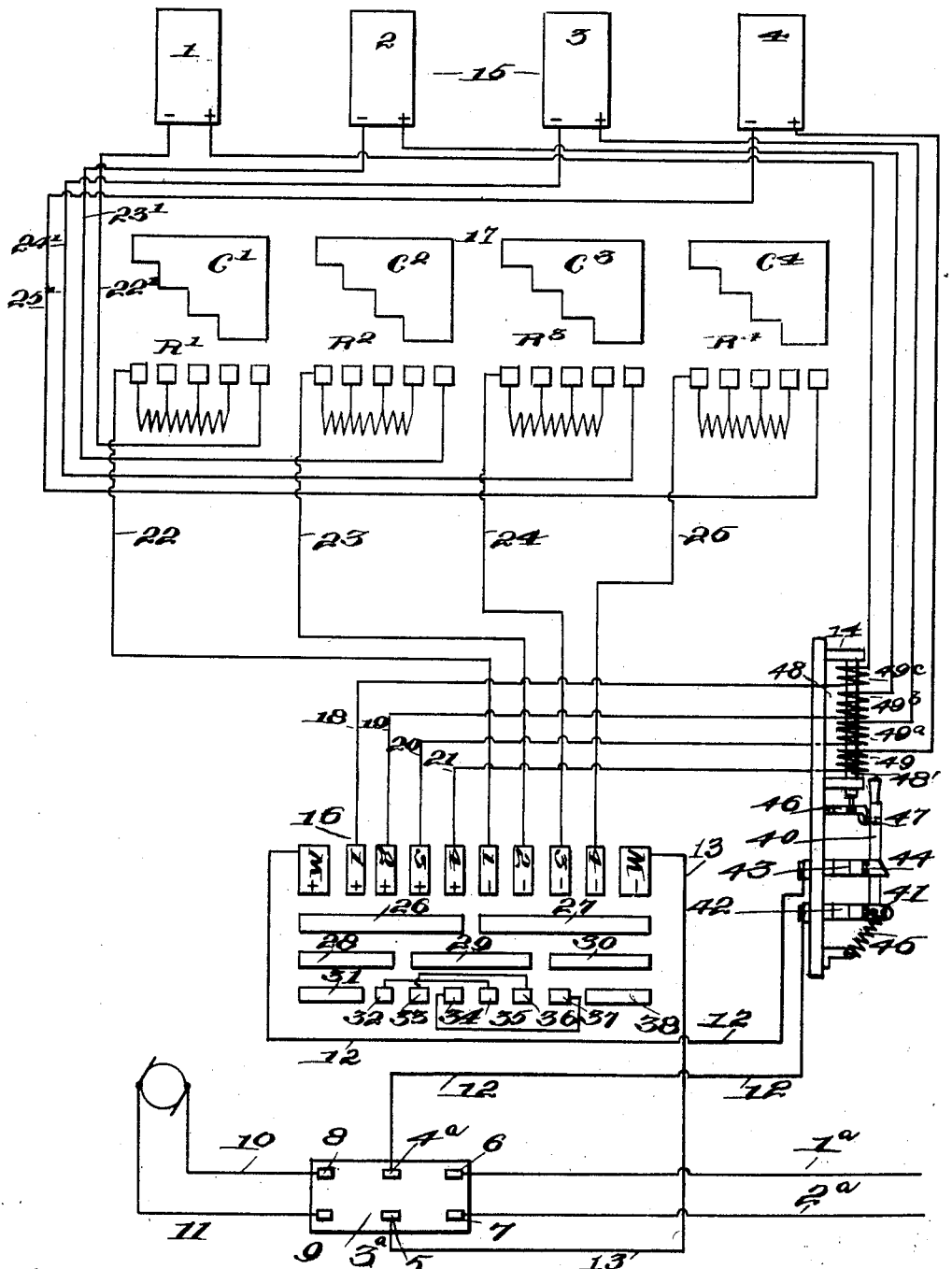

UNITED STATES PATENT OFFICE.

FRANK L. SESSIONS, OF COLUMBUS, OHIO, ASSIGNOR TO JOSEPH A. JEFFREY, OF COLUMBUS, OHIO.

CONTROLLER FOR STORAGE BATTERIES AND SIMILAR PURPOSES.

No. 858,478.            Specification of Letters Patent.            Patented July 2, 1907.

Application filed October 29, 1903. Renewed November 9, 1906. Serial No. 342,705.

*To all whom it may concern:*

Be it known that I, FRANK L. SESSIONS, a citizen of the United States, residing at Columbus, in the county of Franklin and State of Ohio, have invented certain new and useful Improvements in Controllers for Storage Batteries and Similar Purposes, of which the following is a specification, reference being had therein to the accompanying drawing.

This invention relates to improvements in the construction and arrangement of the devices by which storage batteries are, on the one hand, connected to the charging lines, and, on the other hand, are subsequently connected to the motor to which they are to supply current.

The apparatus is intended for use in connection with a storage battery whose unit cells are connected up in groups, which groups are maintained during operation, and which may be connected to the motors or other translators either all in parallel, or all in series, or in intermediate series parallel combinations.

In the drawings I have shown more or less conventionally, and by means of what may be regarded as a diagram, a set of parts and a relative arrangement thereof embodying my improvements.

$1^a$ and $2^a$ indicate the lines of a charging circuit which lead to a switch at $3^a$ having terminals or contacts $4^a$ and 5 adapted to be connected to the terminals at 6 and 7 of the charging lines, these contacts $4^a$ and 5 being the terminals of the circuit through the battery and the resistance and controlling devices. These terminal contacts $4^a$ and 5 are also adapted to be shifted into contact with the terminals at 8 and 9 by which the battery circuit is connected to the lines 10 and 11 that lead to the motors or translators. 12 and 13 indicate lines extending from the switch $3^a$ to the controlling apparatus.

The storage battery is itself conventionally illustrated by 15. It may be composed of any desired number of unit cells. Where a large number of such unit cells is used they are so divided that there shall be several sets or groups of any desired number, and each group containing any desired number of unit cells.

For the purpose of illustration, I have shown the cells as divided into four groups indicated by 1, 2, 3 and 4. Between the battery and switch at $3^a$ are interposed the resistance devices, the controller mechanism and the circuit breaker.

The controller is indicated as an entirety by 16, the circuit breaker by 14 and the resistance devices by 17. The controller indicated may be regarded as one of the rotary drum or barrel type. It has a main line terminal M− for the switch line 13 and an opposite terminal at M+ for the other switch line 12. Between these two terminals it has two series of contacts, one series including those at 1+, 2+, 3+, 4+, and the other series including those at 1−, 2−, 3−, 4−. From the contacts 1+, 2+, 3+, 4+, respectively, extend the lines 18, 19, 20, 21 to the positive terminals of the groups respectively, 1, 2, 3, and 4 of the battery cells. From the contacts 1−, 2−, 3−, 4−, extend the lines 22, 23, 24, and 25 toward the negative terminals of the groups, but in each of these lines is inserted a section of the resistance, as will be described.

Each group of the battery cells is furnished with its own resistance apparatus. The several sections of resistance, proper, are indicated by R′, $R^2$, $R^3$, $R^4$. Each of these is provided with its commutator, the commutators being indicated by C′, $C^2$, $C^3$, $C^4$. By preference the several commutators are connected to one operating device, as a shaft, cylinder, drum or the like, and are all moved together similarly. That is to say, each commutator brings into circuit for its battery group the same resistance that is brought in by each of the other commutators and at the same times, and, similarly, they all simultaneously cut out equal amounts of resistance. The aforesaid lines 22, 23, 24, 25 extend respectively. From the initial terminals of the resist- to the final coil terminals of the resistances C′ $C^2$, $C^3$, $C^4$ ance sections extend the wires 22′, 23′, 24′, 25′. These run to the negative terminals of the battery groups.

The controller is provided with three sets of movable contacts, those in the first set being indicated by 26, 27; those in the second set by 28, 29 and 30; those in the third set by 31, 32, 33, 34, 35, 36, 37 and 38. When the controller is turned partway, it will be seen that the connector bar 26 connects electrically all of the contacts or terminals, M+, 1+, 2+, 3+, and 4+, and that at the same time the connector bar 27 connects all of the terminals or contacts M−, 1−, 2−, 3−, 4−. At such time all of the four groups of the battery will be in parallel with each other and, if the resistance commutators are in operation, the current will travel in a similar direction through all the lines 18, 19, 20 and 21 to the connector bar 26 (assuming the battery to be discharging) and thence over the line 12 to the switch $3^a$ and over the line 10 to the motor or translator; and from the latter back over the lines 11 and 13 to the contact or terminals 1−, 2−, 3−, 4−, and thence to the negative sides of the battery groups. While they are thus in parallel more or less resistance can be introduced into each of the group circuits by properly moving the commutators C′, $C^2$, $C^3$, $C^4$.

To connect all of the battery groups in series with each other, the controller is moved far enough to bring the movable contacts 31 to 38 inclusive into contact with the row of connectors from M+ to M−. When so placed the current entering at M− travels through the conductor bar 38 to terminal 4−, and thence travels over lines 25 and 25′ to group 4; thence over line 21 to terminal 4+ and connectors 34 and 37 to 3−; thence over lines 24 and 24′ to group 3 of the battery; thence over line 20 to terminals and connectors 3+, 33, 36 and 2−; thence over lines 23 and 23′ to battery group 2; thence over line 19 to terminals 2+, 32, 35 and 1−; thence over lines 22 and 22′ to battery group 1; thence over line 18 to 1+, 31 and M+, and thence to line 12 and the motor. That is to say, when the controller is adjusted as last described the battery groups are all in series with each other. But this change in the coupling up of the battery groups has not effected the relation of any of the resistance sections R′ to R⁴ with their groups respectively. That is to say, each battery group has the same resistance interposed between it and the line which it had when the groups were all coupled in parallel.

To connect up the battery groups in pairs with the pairs in series with each other, the controller is so turned as to bring the connector bars 28, 29 and 30 into action. Then the current entering at terminal M− travels through connector bar 30, terminals 3−, 4−, lines 24, 25, 24′ and 25′ to the battery groups 3 and 4, thence over lines 20 and 21 to terminals 3+, 4+ connector bar 29, terminals 1−, 2−, lines 22, 23 and 22′, 23′ to the battery groups 1 and 2 and thence over the lines 18 and 19 to the terminals 1+, 2+, the connector bar 28, the terminal M+, the line 12 and the motor or translator; returning from the latter over the line 11. Under these circumstances it will be seen that the battery groups 3 and 4 are connected up as a pair and the battery groups 1 and 2 as another pair, which pairs are in series with each other, but each having its two groups in multiple with each other. It will be understood that during the operation last described the commutators at C′, C², C³, C⁴ have been moved so as to close their respective circuits. And it will be seen that the several resistance sections (under the assembling of the battery groups just described) will retain the same relations relatively to their respective groups that they had when all of the groups were in multiple relationship and the same that they had when all were in series.

Any suitable form of automatic circuit breaker can be combined with the parts above described. I prefer one of the sort which I have indicated at 14, the illustration being in some respects conventional and in others complete.

40 is a bar or lever hinged at 41 to a terminal post 42 to which is connected one part of the conductor line 12.

43 is a terminal having contact plates at 44 between which the bar 40 can be pressed, this terminal 43 being connected to the other part of the switch line 12. The bar 40 bridges from the terminals 42 and 43 and a spring at 45 tends normally to draw the bar away from the contacts at 44 and break the circuit. This is prevented by means of a hinged lock piece 46 which engages with a hook 47 on the bar 40.

48 is a solenoid magnet the core 48′ of which is pivotally connected to the lock 46.

49, 49ª, 49ᵇ, 49ᶜ are coils around the core 48. Each coil is independent of the others and is in circuit with one of the group lines 19 to 21 of the battery. That is to say, these coils respectively, are interposed between the cell groups and the positive terminals of the controller. And in whatsoever combination (of those above described) the groups are put it will be seen that it is always the case that the current from each group passes through its own signal coil of the breaker magnet. The ampere turns around the magnet are the same when the groups of cells are delivering equal quantities of current irrespective of whether the groups are all in series or are all in parallel or are arranged in multiple series. Consequently, the circuit breaker acts uniformly under all adjustments of the groups and at all times affords constant protection for the battery. If the current at any time passes the limit which has been predetermined the solenoid core 48 is drawn backward, hook 46 is pulled away from the hook 47 and the spring 45 quickly draws the lever or bar 40 away from the contacts at 44 and the whole circuit is broken.

I have above described more specifically the relations and the actions of the parts when the battery is discharging. But it will be seen that a mechanism having parts constructed and arranged as above described presents the same advantages as a means of regulation and control when the battery is being charged. When charging the switch contacts 4ª and 5 are thrown into engagement with the terminals at 6 and 7 of the charging lines 1ª and 2ª. The direction of the travel of the current can be regarded as the opposite of those above described, but otherwise the devices and their modes of operation are the same as has been set forth.

In practice with storage batteries, it is found that in grouping the cells in such way that with successive steps the terminal voltage is greatly increased, severe shocks are imparted to the motors, gearing etc. I overcome this serious difficulty by providing a variable resistance in series with a predetermined part of the battery, whereby the shocks are graded; and as a result the car or other driven mechanism is started smoothly and the life of all the parts is lengthened. The lines (positive and negative) extending from each of the groups to the controller may be regarded as a sub-circuit in relation to the entire system, and it is in each of these sub-circuits that the variable resistance is inserted for the corresponding source of electric supply, which resistance always remains in series with its source, irrespective of the relationship in which the latter may be coupled up with the other sources. This system of control is equally applicable for the distribution of current from dynamos or generators which may be substituted for the groups of battery cells shown in the drawing. The independent variable resistance in series with each of the generators and each adapted to be adjusted simultaneously and uniformly with the others, will serve to relieve the motors and gearing which are actuated by the generators from severe shocks and strains due to sudden rise in electromotive force at the motor terminals.

It will also be seen that when the groups of cells are being charged, each group may be regarded as a current receiving or translating device and that other current translating devices such as lighting systems, motors, or the like, can be treated in the same way as that above described, where use is made of the system of control herein presented.

What I claim is:

1. The combination of two or more sources of electric supply, a working circuit adapted to be connected therewith for taking current therefrom, variable means for connecting the said sources of electric supply in parallel and in series, alternately, with said working circuit, each source of electric supply having an independent line extending therefrom to said connecting means, and an independent variable resistance in each of said lines, substantially as set forth.

2. The combination of two or more sources of electric supply, a working circuit adapted to be connected therewith, an adjustable controller for connecting the sources of electric supply with the working circuit in parallel or in series, a set of independent resistances each resistance being in the circuit of one of the said sources of electric supply, and means for simultaneously and similarly varying all of the resistances, substantially as set forth.

3. The combination of two or more sources of electric supply, a sub-circuit for each of said sources of electric supply, a working circuit adapted to be connected therewith, a set of independent resistances, and means for connecting the said resistances in parallel or in series in correspondence with the varying connections of the electric sources of supply, substantially as set forth.

4. The combination of two or more sources of electric supply, a sub-circuit for each of the said sources, a resistance in each of the said sub-circuits, a main circuit adapted to be connected with the said sub-circuits, a circuit breaker in the main circuit, and means in each of the sub-circuits for actuating the circuit breaker, substantially as set forth.

5. The combination of two or more sources of electric supply, a sub-circuit for each of said sources, a variable resistance in each of said sub-circuits, a main circuit adapted to be connected to said sub-circuits, an electro magnet coil in each of said sub-circuits, and means in the main circuit controlled by said electro magnet coil for breaking the main circuit, substantially as set forth.

6. The combination of two or more sources of electric supply, a sub-circuit for each of said sources, a resistance in each of said sub-circuits, a main circuit adapted to be connected with the sub-circuits, means for varying all of the said resistances simultaneously, and means for connecting the said sources of supply and their respective resistances in parallel or in series or in series parallel, substantially as set forth.

7. The combination of two or more sources of electric supply, a sub-circuit for each source, means for connecting said sources of supply in series or in parallel, and a variable resistance adapted to be connected to each of said sources of supply and always maintained in series with said sources irrespective of the parallel or series relationship of the series with each other, substantially as set forth.

8. The combination of two or more electric translating devices, a current supply circuit adapted to be connected therewith, means for connecting the said electric translating devices in parallel and series alternately with said current supply circuit, each translating device having an independent line extending therefrom to said connecting means, and an independent variable resistance in each of said lines operable independent of said connecting means, substantially as set forth.

9. The combination of two or more electric translating devices, a current supply circuit adapted to be connected therewith, means for connecting the said electric translating devices in parallel and series alternately with said current supply circuit, each translating device having an independent line extending therefrom to said connecting means, an independent variable resistance in each of said lines operable independent of said connecting means, and means for simultaneously and uniformly regulating said variable resistances, substantially as set forth.

10. The combination of two or more sources of electric supply, a working circuit adapted to be connected therewith, means for connecting said sources of electric supply with said working circuit, each source of electric supply having an independent line extending therefrom to said connecting means, and independent variable resistance in each of said lines.

11. The combination of two or more sources of electric supply, a working circuit adapted to be connected therewith, means for connecting said sources of electric supply with said working circuit, each source of electric supply having an independent line extending therefrom to said connecting means, an independent variable resistance in each of said lines, and means for simultaneously varying all of said variable resistances.

12. The combination of two or more sources of electric supply, a working circuit adapted to be connected therewith, means for connecting said sources of electric supply with said working circuit, each source of electric supply having an independent line extending therefrom to said connecting means, an independent variable resistance in each of said lines, and a circuit breaker interposed between said sources of electric supply and said working circuit.

13. The combination of a plurality of electric translating devices, a working circuit adapted to be connected therewith, a circuit-closing device or controller for connecting said electric devices with said working circuit, an independent line for connecting each of said electric devices to said circuit closer, and an electro-magnetic circuit breaker having a plurality of coils, each one of which is connected in series in one of said independent lines between the said circuit closing device and one of said translating devices.

14. The combination of a plurality of electric translating devices, a working circuit adapted to be connected therewith, a circuit-closing device or controller for connecting said electric devices with said working circuit, an independent line for connecting each of said electric devices to said circuit closer, an electro-magnetic circuit breaker having a plurality of coils, each one of which is connected in series in one of said independent lines between the said circuit-closing device and one of said translating devices, and a variable resistance in each of said independent lines.

In testimony whereof I affix my signature in presence of two witnesses.

FRANK L. SESSIONS.

Witnesses:
C. E. WAXBOM,
L. E. HAMILTON.